(12) United States Patent
Huang

(10) Patent No.: US 6,981,326 B1
(45) Date of Patent: Jan. 3, 2006

(54) GARDENING SCISSORS PROVIDED WITH A PROTECTIVE COVER ON THE SEAM

(75) Inventor: Yao-Chung Huang, Chang Hua Hsien (TW)

(73) Assignee: Ho Cheng Gardening TOols Co., Ltd., Fu Shing Hsiang (TW)

( * ) Notice: Subject to any disclaimer, the term of this patent is extended or adjusted under 35 U.S.C. 154(b) by 28 days.

(21) Appl. No.: 10/753,288

(22) Filed: Jan. 9, 2004

(51) Int. Cl.
*B26B 13/04* (2006.01)

(52) U.S. Cl. .......................................... 30/254; 30/341
(58) Field of Classification Search ................. 30/254, 30/341
See application file for complete search history.

(56) References Cited

U.S. PATENT DOCUMENTS

| | | | |
|---|---|---|---|
| 1,936,113 A * | 11/1933 | Jelliffe | 248/188.8 |
| 3,605,879 A * | 9/1971 | Schaefer, Jr | 165/55 |
| 6,105,256 A * | 8/2000 | Budrow | 30/186 |
| 2002/0124414 A1 * | 9/2002 | Yang | 30/254 |
| 2004/0045174 A1 * | 3/2004 | Nordlin | 30/194 |

* cited by examiner

*Primary Examiner*—Allan N Shoap
*Assistant Examiner*—Isaac N Hamilton
(74) *Attorney, Agent, or Firm*—Alan D. Kamrath; Nikolai & Mersereau, P.A.

(57) ABSTRACT

A gardening scissor includes a handle, a fixed jaw, a movable jaw, a linkage slab, and a module board. The fixed jaw and module board are constructed of two separating boards with a seam between them. The seam is provided with a protective cover by the hood. The width of this hood is capable of providing a cover on the seam, provided that the flexibility of fixed jaw and movable jaw is not hindered. The linkage side of hood is available with a built-in edge. Besides, the built-in edge and the inwall between two boards are provided with a bulge strip and notch for positioning of the hood. It is possible to prevent branches inserting into the seam and enrich the appearance of gardening scissors.

5 Claims, 3 Drawing Sheets

GARDENING SCISSORS PROVIDED WITH A PROTECTIVE COVER ON THE SEAM

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates generally to a gardening scissor, and more particularly to a gardening scissor which is provided with protective cover on the seam.

BACKGROUND OF THE INVENTION

The fixed jaw and movable jaw of conventional gardening scissors are typically comprised of a single board. To enhance its structural strength, the construction of two separating boards at the handle end of fixed jaw and movable jaw has been developed. The present invention is intended to improve gardening scissors available in such construction. However, there are following questions in practice.

When the users lop branches, thin branches are likely to be inserted into the seam of such separating boards. As the branches will contact the interlocking position of gardening scissor after inserting the seam, it is possible for the structural members to be stuck, thus leading to unsmooth operation.

Therefore, with a view to the above-mentioned problems for gardening scissors of multi-layer boards, the responsibility is assumed to pioneer R&D and innovations for gardening scissors of an ideal utility model.

BRIEF SUMMARY OF THE INVENTION

The present invention can offer an improved efficiency as detailed below:

to provide an innovative space configuration design of gardening scissors, for which a hood is added on the seam of boards; and to provide a cover on the seam of boards via the help of the added hood, thus it is possible to prevent branches being inserted into the seam for a protective result.

The new advantages of this invention are as follows. Based upon the added hood, the color and texture of hood have a variety of changes due to the fabrication of plastics. So, more diversified appearances of gardening scissors are expected. In addition, the hood may be applied to provide cover on hard and sharp edges/angles of metal boards of gardening scissors, thereby reducing the possible damage to personnel and trees.

DETAILED DESCRIPTION OF THE INVENTION

The features and the advantages of the present invention will be more readily understood upon a thoughtful deliberation of the following detailed description of a preferred embodiment of the present invention with reference to the accompanying drawings.

Figure 1:
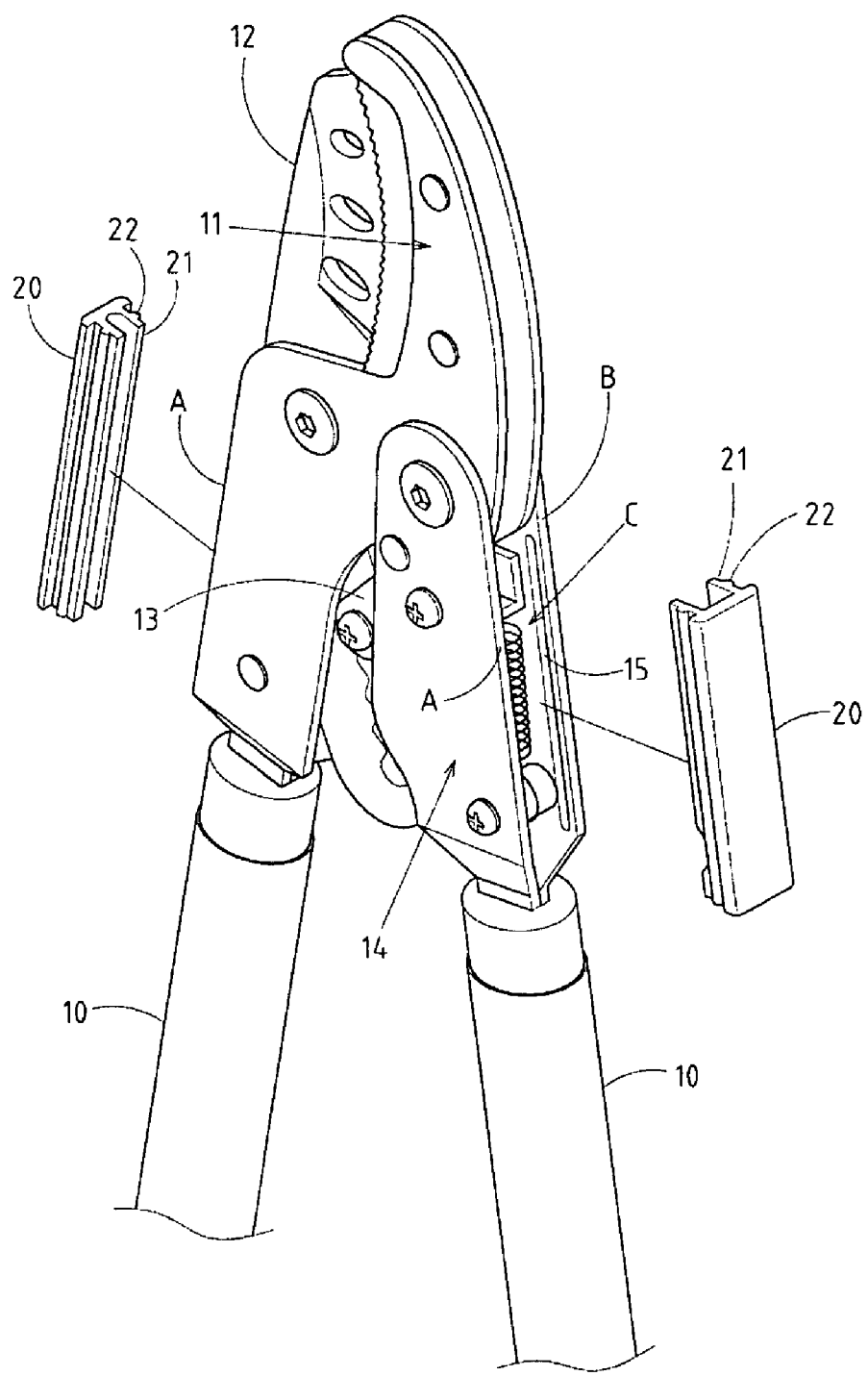
FIG. 1 shows an exploded perspective view of the present invention.
Figure 2:
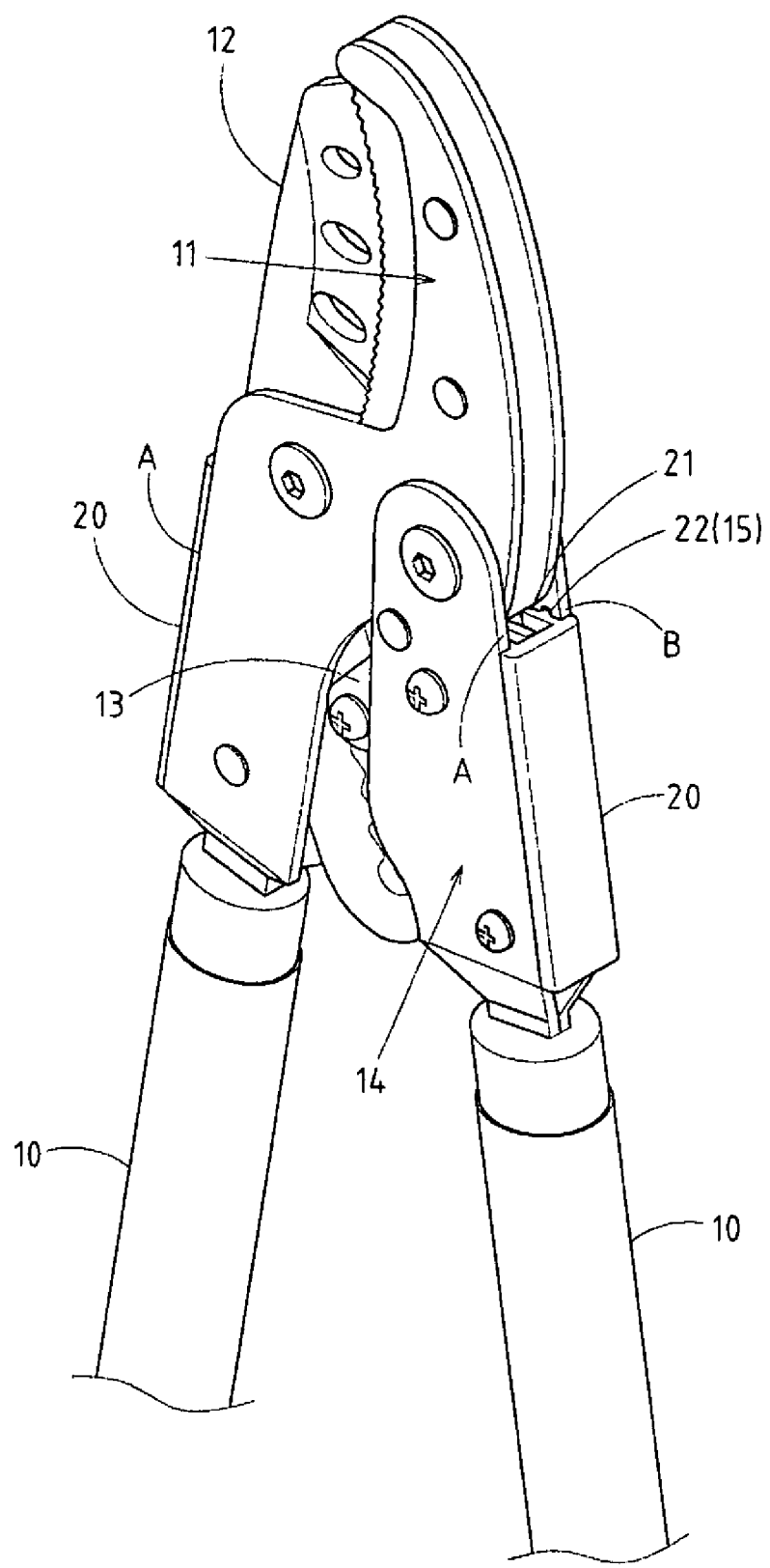
FIG. 2 shows an exploded perspective view of the present invention.
Figure 3:
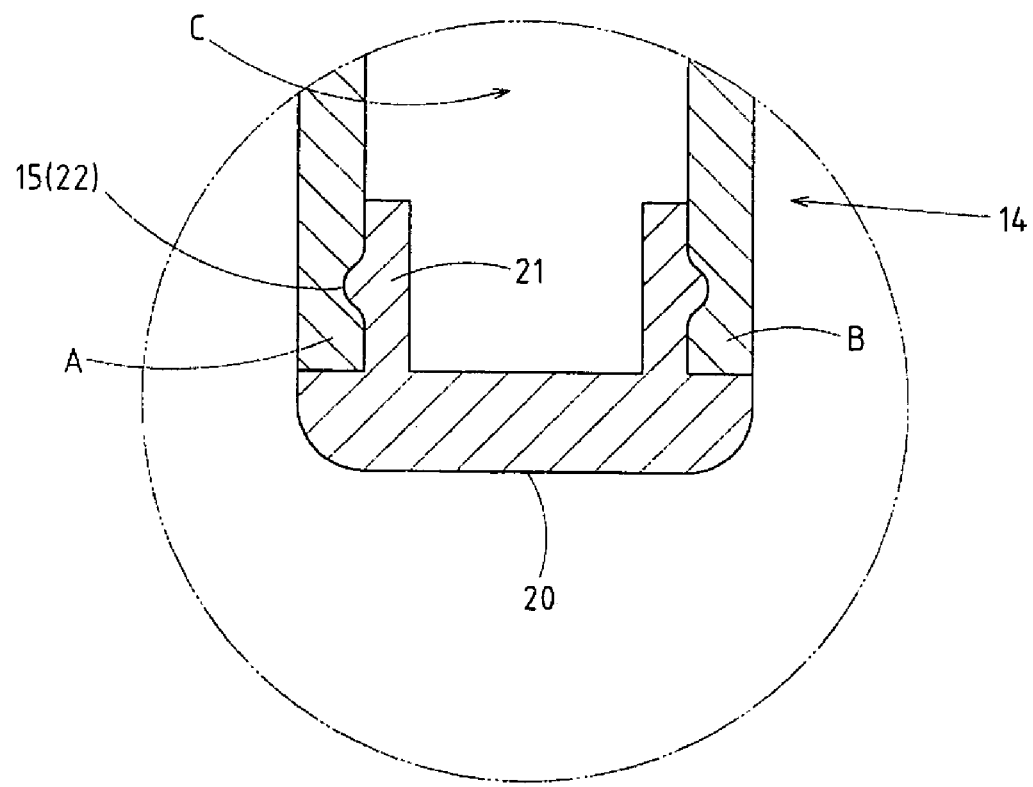
FIG. 3 shows a partial assembly cross-sectional view of the present invention.

Firstly, refer to the modified examples of gardening scissors in the present invention, as shown in FIGS. 1, 2 and 3. The gardening scissor is normally comprised of two handles 10, a fixed jaw 11, a movable jaw 12 and a linkage slab 13 as well as a module board 14. The fixed jaw 11 and module board 14 are constructed of two separating boards A and B with a seam C between them.

The hood 20, which is used to provide a protective cover on the seam C, may be constructed of plastics. The size area, length and width of this hood 20 is capable of covering the seam C, provided that the flexibility of fixed jaw 11 and movable jaw 12 is not hindered. The linkage side of hood 20 is available with built-in edge 21, which is capable of inserting the inwall between two boards A and B. Besides, the built-in edge 21 and the inwall between two boards A and B are provided with bulge strip 22 and notch 15 for positioning of hood 20.

I claim:

1. A gardening scissor comprising:
   a fixed jaw and a module board each constructed of two separating boards, and a seam defined between the two separating boards to allow insertion of a hood made of plastic material, wherein:
   the hood has two spaced built-in edges inserted between the two separating boards of each of the fixed jaw and the module board;
   each of the two separating boards of each of the fixed jaw and the module board is formed with a notch;
   each of the two built-in edges of the hood is formed with a bulge strip inserted into and locked in the notch of the respective separating board of each of the fixed jaw and the module board.

2. The gardening scissor as claimed in claim 1, wherein the hood has a substantially U-shaped cross-sectional profile.

3. The gardening scissor as claimed in claim 1, wherein the notch of each of the two separating boards of each of the fixed jaw and the module board has a substantially arc-shaped cross-sectional profile.

4. The gardening scissor as claimed in claim 1, wherein the bulge strip of each of the two built-in edges of the hood has a substantially arc-shaped cross-sectional profile.

5. The gardening scissor as claimed in claim 1, wherein the bulge strip of each of the two built-in edges of the hood is snapped into the notch of the respective separating board of each of the fixed jaw and the module board so that the two built-in edges of the hood are fixed between the two separating boards of each of the fixed jaw and the module board without aid of any screw fastener.

* * * * *